(12) United States Patent
Kamerbeek et al.

(10) Patent No.: US 9,815,616 B2
(45) Date of Patent: Nov. 14, 2017

(54) CAPSULE FOR CONTAINING BEVERAGE INGREDIENTS

(75) Inventors: Ralf Kamerbeek, De Meern (NL); Hendrik Cornelis Koeling, Amersfoort (NL); Arend Cornelis Jacobus Biesheuvel, Werkendam (NL)

(73) Assignee: Koninklijke Douwe Egberts B.V., Utrecht (NL)

(*) Notice: Subject to any disclaimer, the term of this patent is extended or adjusted under 35 U.S.C. 154(b) by 396 days.

(21) Appl. No.: 13/324,854

(22) Filed: Dec. 13, 2011

(65) Prior Publication Data

US 2012/0231123 A1 Sep. 13, 2012

Related U.S. Application Data

(63) Continuation of application No. PCT/NL2009/050826, filed on Dec. 30, 2009.

(30) Foreign Application Priority Data

Jun. 17, 2009 (EP) .................................... 09162895
Jun. 17, 2009 (EP) .................................... 09162914
(Continued)

(51) Int. Cl.
*B65D 85/804* (2006.01)
*A47J 31/36* (2006.01)
(Continued)

(52) U.S. Cl.
CPC .......... *B65D 85/8043* (2013.01); *A23F 5/262* (2013.01); *A47J 31/368* (2013.01);
(Continued)

(58) Field of Classification Search
CPC ... B65D 85/8043; A47J 31/368; A47J 31/369; A47J 31/407; A23F 5/262
See application file for complete search history.

(56) References Cited

U.S. PATENT DOCUMENTS

| 3,615,708 A | 10/1971 | Abile-Gal |
| 4,321,139 A | 3/1982 | Auclair |

(Continued)

FOREIGN PATENT DOCUMENTS

| CA | 2717151 | 2/2016 |
| CN | 1681425 A | 10/2005 |

(Continued)

OTHER PUBLICATIONS

Elastic/Plastic Deformation, NDT Resource Center, [on line], retrived May 11, 2015. Retrieved from the Internet: URL:<https://www.nde-ed.org/EducationResources/CommunityCollege/Materials/Structure/deformation.htm>.*

(Continued)

*Primary Examiner* — Erik Kashnikow
*Assistant Examiner* — Chaim Smith
(74) *Attorney, Agent, or Firm* — Foley & Lardner LLP

(57) ABSTRACT

A capsule for containing beverage ingredients may be designed for insertion in a beverage production device in which a liquid under pressure enters the capsule to drain a beverage from the capsule, wherein the capsule includes a circumferential first wall, a second wall closing the circumferential first wall at a first end, and a third wall closing the circumferential first wall at a second, open, end opposite the second wall, the first, second and third wall enclosing an inner space including the beverage ingredients, wherein the capsule includes a sealing member for achieving a sealing effect between the capsule and the beverage production device, wherein at least one of the first, second and third wall as such is configured to act as the sealing member.

9 Claims, 8 Drawing Sheets

(30) Foreign Application Priority Data

| Jun. 17, 2009 | (EP) | 09162931 |
| Jun. 19, 2009 | (EP) | 09163310 |
| Aug. 13, 2009 | (EP) | 09167851 |
| Sep. 17, 2009 | (EP) | 09170590 |

(51) Int. Cl.
  *A47J 31/40* (2006.01)
  *A23F 5/26* (2006.01)
  *B65D 65/46* (2006.01)

(52) U.S. Cl.
  CPC .......... *A47J 31/369* (2013.01); *A47J 31/407* (2013.01); *B65D 65/466* (2013.01)

(56) References Cited

U.S. PATENT DOCUMENTS

| 4,417,504 A | 11/1983 | Yamamoto |
| 4,775,048 A | 10/1988 | Baecchi et al. |
| 4,859,337 A | 8/1989 | Woltermann |
| 5,197,374 A | 3/1993 | Fond |
| 5,242,702 A | 9/1993 | Fond |
| 5,325,765 A | 7/1994 | Sylvan et al. |
| 5,840,189 A | 11/1998 | Sylvan et al. |
| D408,679 S | 4/1999 | Potts et al. |
| 6,079,315 A | 6/2000 | Beaulieu et al. |
| 6,082,247 A | 7/2000 | Beaulicu |
| 6,142,063 A | 11/2000 | Beaulieu et al. |
| 6,182,554 B1 | 2/2001 | Beaulieu et al. |
| D452,433 S | 12/2001 | Lazaris |
| D452,434 S | 12/2001 | Sweeney |
| 6,440,256 B1 | 8/2002 | Gordon et al. |
| D462,865 S | 9/2002 | Honan et al. |
| D474,110 S | 5/2003 | Sweeney |
| D474,111 S | 5/2003 | Lazaris |
| 6,589,577 B2 | 7/2003 | Lazaris et al. |
| 6,606,938 B2 | 8/2003 | Taylor |
| 6,607,762 B2 | 8/2003 | Lazaris et al. |
| 6,644,173 B2 | 11/2003 | Lazaris et al. |
| 6,645,537 B2 | 11/2003 | Sweeney et al. |
| 6,655,260 B2 | 12/2003 | Lazaris et al. |
| 6,658,989 B2 | 12/2003 | Sweeney et al. |
| 6,666,130 B2 | 12/2003 | Taylor et al. |
| 6,672,200 B2 | 1/2004 | Duffy et al. |
| 6,708,600 B2 | 3/2004 | Winkler et al. |
| D489,215 S | 5/2004 | Honan et al. |
| D502,362 S | 3/2005 | Lazaris et al. |
| D513,572 S | 1/2006 | Schaffeld et al. |
| 7,165,488 B2 | 1/2007 | Bragg et al. |
| D544,299 S | 6/2007 | Schaffeld et al. |
| D554,299 S | 10/2007 | Ragonetti et al. |
| 7,347,138 B2 | 3/2008 | Bragg et al. |
| 7,360,418 B2 | 4/2008 | Pelovitz |
| 7,377,162 B2 | 5/2008 | Lazaris |
| 7,398,726 B2 | 7/2008 | Streeter et al. |
| 7,513,192 B2 | 4/2009 | Sullivan et al. |
| 7,523,695 B2 | 4/2009 | Streeter et al. |
| 7,543,527 B2 | 6/2009 | Schmed |
| 7,552,672 B2 | 6/2009 | Schmed |
| 7,640,845 B2 | 1/2010 | Woodnorth et al. |
| 7,856,920 B2 | 12/2010 | Schmed et al. |
| 2004/0045443 A1 | 3/2004 | Lazaris et al. |
| 2005/0051478 A1 | 3/2005 | Karanikos et al. |
| 2005/0205601 A1 | 9/2005 | Taylor |
| 2005/0287251 A1 | 12/2005 | Lazaris et al. |
| 2006/0174773 A1 | 8/2006 | Taylor |
| 2006/0292012 A1 | 12/2006 | Brudevold et al. |
| 2008/0095904 A1 | 4/2008 | Sullivan et al. |
| 2008/0115674 A1 | 5/2008 | Huang et al. |
| 2008/0134902 A1 | 6/2008 | Zimmerman et al. |
| 2009/0017177 A1 | 1/2009 | Yoakim et al. |
| 2010/0024658 A1 | 2/2010 | Jacobs et al. |
| 2010/0303964 A1 | 12/2010 | Beaulieu et al. |

FOREIGN PATENT DOCUMENTS

| CN | 101048094 | 10/2007 | |
| CN | 101410041 | 4/2009 | |
| DE | 102005016297 | 10/2006 | |
| EP | 0 468 080 | 12/1994 | |
| EP | 1 700 548 | 8/2007 | |
| EP | 1 555 219 | 6/2011 | |
| FR | 2041380 | 1/1971 | |
| JP | 2008-517838 | 5/2008 | |
| WO | WO-2006/045536 | 5/2006 | |
| WO | WO-2006/137737 | 12/2006 | |
| WO | WO-2007/137974 | 12/2007 | |
| WO | WO 2008/037642 | * 4/2008 | .............. A47J 31/40 |
| WO | WO-2009/110783 | 9/2009 | |
| WO | WO-2010/084475 | 7/2010 | |

OTHER PUBLICATIONS

International Search Report for PCT/NL2009/050826, dated Mar. 1, 2010, 4 pages.

European Patent Office Communication Pursuant to Article 94(3) EPC received for European Patent Application No. 09 796 119.7, dated Dec. 4, 2012, 5 pages.

* cited by examiner

CAPSULE FOR CONTAINING BEVERAGE INGREDIENTS

CROSS-REFERENCE TO RELATED PATENT APPLICATIONS

This application is a continuation of International Patent Application No. PCT/NL2009/050826, filed Dec. 30, 2009, which claims priority to European Patent Application Nos. 09162895.8, filed Jun. 17, 2009; 09162914.7, filed Jun. 17, 2009; 09162931.1, filed Jun. 17, 2009; 09163310.7, filed Jun. 19, 2009; 09167851.6, filed Aug. 13, 2009; and 09170590.5, filed Sep. 17, 2009. All of these applications are incorporated herein by reference.

BACKGROUND

The invention relates to a capsule for containing beverage ingredients, the capsule being designed for insertion in a beverage production device in which a liquid under pressure enters the capsule to drain a beverage from the capsule, wherein the capsule comprises a circumferential first wall, a second wall closing the circumferential first wall at a first end, and a third wall closing the circumferential first wall at a second, open, end opposite the second wall, the first, second and third wall enclosing an inner space comprising the beverage ingredients, wherein the capsule comprises a sealing member for achieving a sealing effect between the capsule and the beverage production device.

EP 1700548 (EP'548) discloses a capsule comprising a cup-like base body and a closing foil member. The known capsule is designed for insertion in a beverage production device in which a liquid under pressure enters the capsule in order to interact with ingredients in the capsule and to drain a beverage from the capsule.

According to EP'548, it has to be assured that during operation, the only water flow is actually taking place through the interior of the capsule and that no water can flow from the water injector into the interstice between an annular enclosing member and the exterior of the capsule and then to the draining bore of the device. According to EP'548, in a known system, any water flow exterior to the capsule is stopped by a sealing engagement, that is achieved by a pinching engagement between the annular member, the flange-like rim of the side wall of the capsule and a capsule holder.

Also according to EP'548, an improvement could be thought of according to which the sealing engagement is further improved by lining the inner wall of the annular member with a rubber-elastic material. With other words, according to said approach the sealing engagement is assured by structures fixed to or attached with the beverage-producing device.

EP'548 aims at an improvement of the sealing engagement positioned between the liquid inlet and the beverage draining side of such a beverage production system. To that aim, EP1700548 proposes to transfer a resilient part of the sealing engagement from the beverage production device to the capsule. The advantage is that any resilient sealing member is only used once (i.e. only with the associated capsule) such that a proper functioning of the sealing can be assured and no hygienic problems can occur at the sealing member. Following from EP1700548, the capsule comprises a dedicated hollow sealing member on the outer surface of the capsule for achieving a sealing effect between an enclosing member of the beverage production device and a capsule holder (of the production device).

SUMMARY

The present invention aims to provide to improve the capsule. Particularly, the invention aims to provide a capsule that can also solve or alleviate abovementioned problems, wherein the capsule can be produced in an efficient, economical manner.

According to an aspect of the invention, this is achieved by the features of claim 1.

Preferably, at least one of the first, second and third wall as such is configured to act as the sealing member. Thus, the capsule does not have to be provided with a dedicated hollow sealing member. In this way, manufacturing of the capsule can be carried out in an efficient manner, utilizing less energy and materials than prior art capsule manufacturing generally requires. Besides, the present invention can provide an improved sealing effect compared to prior art solutions, particularly since it is at least one capsule wall itself that can act as sealing member.

An embodiment of the invention may provide a capsule having a wall acting as a sealing member, the wall providing a sealing effect between different members of the beverage production device. Alternatively, for example, the sealing wall can be arranged to provide a sealing effect with only one (opposite) part of the beverage production device.

Also, an aspect of the invention is characterized by the features of claim 14. Advantageously, there is provided a system for preparing a predetermined quantity of beverage suitable for consumption using an extractable product, comprising: an exchangeable capsule, and an apparatus comprising a fluid dispensing device for supplying an amount of a fluid, such as water, under pressure (for example a pressure of at least six bar) to the exchangeable capsule, and a receptacle for holding the exchangeable capsule, wherein the exchangeable capsule comprises a circumferential first wall, a second wall closing the circumferential first wall at a first end, and a third wall closing the circumferential first wall at a second, open, end opposite the second wall, the first, second and third wall enclosing an inner space comprising the beverage ingredients, wherein the capsule comprises a sealing member for achieving a sealing effect between the capsule and the beverage production device. Then, preferably, at least one of the first, second and third wall of the capsule as such is configured to act as the sealing member.

Also, an aspect of the invention provides an advantageous method for preparing a predetermined quantity of beverage suitable for consumption using an extractable product, comprising: providing an exchangeable capsule; providing an apparatus comprising a receptacle for holding the exchangeable capsule; arranging the exchangeable capsule in abutment with a support surface of the receptacle, wherein a wall of the capsule acts as a sealing member to achieve a fluid tight seal between the capsule and the beverage production device; and supplying fluid under the pressure to the extractable product for preparing the beverage.

BRIEF DESCRIPTION OF THE DRAWINGS

The invention will now be further elucidated by means of, non-limiting, examples referring to the drawing, in which FIG. 1 schematically shows an embodiment of a system for preparing a beverage.

In the present application, the same or corresponding features are denoted by the same or corresponding reference signs.

DETAILED DESCRIPTION OF EXEMPLARY EMBODIMENTS

Figure 1:
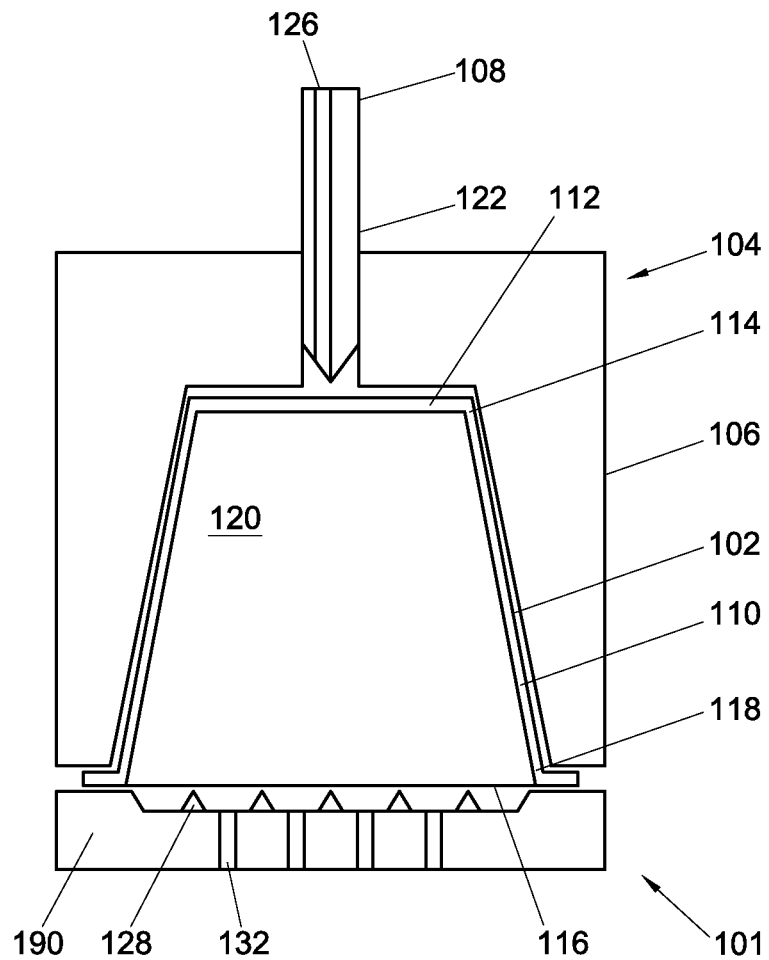

FIG. 1 shows a system 101 for preparing a predetermined quantity of beverage suitable for consumption using an extractable product. The system 101 comprises an exchangeable first capsule 102, and an apparatus 104. In the present example, the apparatus 104 comprises a receptacle 106 for holding the exchangeable capsule 102. In FIG. 1a a gap is drawn between the capsule 102 and the receptacle 106 for clarity. It will be appreciated that, in use, the capsule 102 may lie in contact with the receptacle 106. Commonly, the receptacle 106 may have a shape complementary to the shape of the capsule 102. The apparatus 104 further comprises a fluid dispensing device 108 for supplying an amount of a fluid, for example water, under a pressure, of e.g. 9 bars, to the exchangeable capsule 102.

As follows from the drawing, the exchangeable capsule 102 may comprises a circumferential wall 110, a bottom 112 closing the circumferential wall 110 at a first end 114, and a lid 116 closing the circumferential wall 110 at a second end 118 opposite the bottom 112. The circumferential wall 110, the bottom 112 and the lid 116 enclose an inner space 120 comprising the extractable product.

The system 101 of FIG. 1 comprises bottom piercing means 122 intended for piercing the capsule 102. FIG. 1 shows the bottom piercing means 122 in a retracted position. When the bottom piercing means 122 is in an extended position (not shown), it may create an entrance opening in the bottom 112 of the capsule for supplying the fluid to the extractable product through the entrance opening. For example, the piercing means 122 may comprise a bore 126 through which the fluid can be supplied to the capsule. The system 101 of FIG. 1 further comprises lid piercing means 128, here embodied as protrusions, intended for piercing the lid 116 of the capsule 102. For example, the lid piercing means 128 can be part of a capsule holder 190 (see FIGS. 1-2).

The system 101 shown in FIG. 1 may be operated as follows for preparing a cup of coffee, wherein the extractable product is roasted and ground coffee (see also the content of EP1700548). During operation, the capsule 102 is placed in the receptacle 106 (see FIG. 1). The receptacle 106 and capsule holder 190 may hold the capsule 102 there-between. Particularly, the receptacle 106 and capsule holder 190 may be movable towards each other, to a capsule holding state, to hold the capsule there-between, and away from each other to release a used capsule and to receive a fresh capsule.

During operation, when the capsule is held between the receptacle 106 and holder 190, the bottom piercing means are activated to pierce the bottom 112 of the capsule 102 for creating the entrance opening. The fluid, here hot water under pressure, is supplied to the extractable product in the inner space 120 through the entrance opening. The water will wet the coffee grounds and extract the desired substances to form the coffee beverage. For example, during supplying the water under pressure to the inner space 120, the pressure inside the capsule 102 will rise. The rise in pressure will cause the lid 116 to deform and be pressed against the lid piercing means 128. Once the pressure reaches a certain level, the tear strength of the lid 116 will be surpassed and the lid will rupture against the lid piercing means 128, creating exit openings. The prepared coffee will drain from the capsule 102 through the exit openings 130 and outlets 132 of the receptacle 106, and may be supplied to a container such as a cup (not shown).

During operation, particularly when the receptacle 106 and capsule holder 190 have been moved towards each other and hold a capsule 102 there-between, it is preferably assured that the only water flow is actually taking place through the interior of the capsule 102. In a known system, water flow exterior to the capsule is stopped by a sealing engagement, that is achieved by a pinching engagement between an annular member of a receptacle, a flange-like rim of a side wall of the capsule and a capsule holder. In an alternative system, the capsule includes a dedicated hollow sealing member on the outer surface of the capsule for achieving a sealing effect between an enclosing member of the beverage production device and a capsule holder of the production device.

Figure 2:
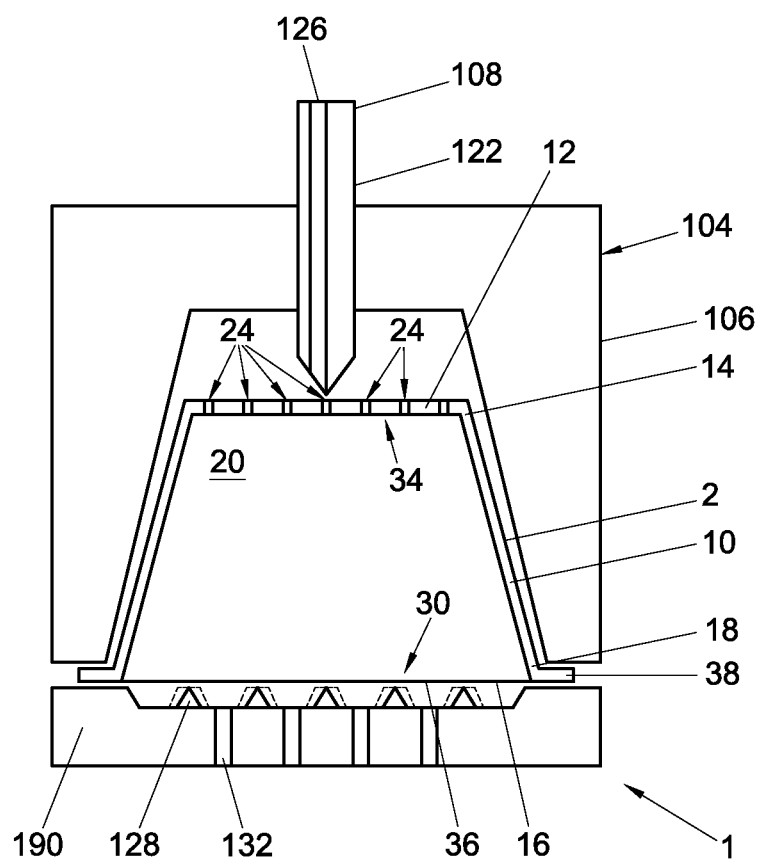
FIG. 2 shows a an alternative embodiment of a system for preparing a beverage.

FIG. 2 shows an alternative embodiment of a system 1 for preparing a predetermined quantity of beverage suitable for consumption using an extractable product. This system 1 comprises an exchangeable capsule 2, and an apparatus 104. The apparatus 104 comprises a receptacle 106 for holding the exchangeable capsule 2. In this example, the receptacle 106 has a shape complementary to the shape of the capsule 2. In FIG. 2 a gap is drawn between the capsule 2 and the receptacle 106 for clarity. It will be appreciated that, in use, the capsule 2 may lie in contact with the receptacle 106. The apparatus 104 further comprises a fluid dispensing device 108 for supplying an amount of a fluid, for example water, under pressure to the exchangeable capsule 2.

In the system 1 shown in FIG. 2, the exchangeable capsule 2 comprises a circumferential wall 10, a bottom 12 closing the circumferential wall 10 at a first end 14, and a lid 16 closing the circumferential wall 10 at a second end 18 opposite the bottom 12. The circumferential wall 10, the bottom 12 and the lid 16 enclose an inner space 20 comprising the extractable product. In this example, the exchangeable capsule 2 comprises an amount of extractable product suitable for preparing a single portion of the beverage, preferably a single cup of the beverage, e.g. from 30-200 ml of the prepared beverage. The exchangeable capsule, thus, is a single-portion-pack.

The system 1 of FIG. 2 may comprise bottom piercing means 122 intended for piercing a capsule 102 as shown in FIG. 1. FIG. 2 shows the bottom piercing means in an extended position, intended for creating the entrance opening 124 in the bottom 112 of the first capsule 102. According to an embodiment, the capsule 2 may comprise an entrance filter 34 (see FIGS. 3a-3d) which is positioned at a distance from the bottom piercing means 12, such that the capsule 2 is not pierced by the bottom piercing means 122 and the bottom 12 stays intact when the bottom piercing means is brought in the extended position.

In FIG. 2 the piercing means 122 comprise a bore 126 through which the fluid is supplied to an inner space of the receptacle 106. The fluid, here hot water under a pressure of e.g. more than 6 bars, will flow through the entrance filter 34 into the inner space 20 of the capsule 2 for extracting desired substances from the extractable product, in this example approximately 4.5 to 8 grams, for example 5-6 grams (or for example 7 grams) of roasted and ground coffee, for preparing, in this example the single cup of the beverage, here coffee.

Thus, more in general, in the example of FIG. 2, the bottom 12 comprises an entrance area, formed by the entrance filter 34, and the system 1 is arranged for bringing the fluid dispensing device 108 in fluid connection with the entrance area for supplying the fluid to the extractable product for preparing the beverage.

In the example of FIG. 2, the circumferential wall 10 is substantially rigid. The circumferential wall may e.g. comprise a plastics material and may be formed by e.g. injection moulding, vacuum-forming, thermoforming or the like. In the example of FIG. 2 the bottom 12 is integral with the circumferential wall. In this example the entrance filter 34 is formed by a plurality of entrance openings 24 in the bottom 12. In this example the plurality of entrance openings 24 is distributed over substantially the entire bottom 12. Thus, the fluid is supplied to the extractable product via the plurality of entrance openings 24, which causes the extractable product to be wetted over substantially the entire cross section of the capsule 2. Hence, a very homogeneous supply of fluid to the extractable product is obtained. Thus, the risk of occurrence of preferential paths via which the fluid flows through the extractable product is greatly reduced.

According to a further embodiment, the system 1 of FIG. 2 may comprise lid piercing means 128 intended for piercing the lid 116 of the first capsule 102 when the lid 116 sufficiently presses against the lid piercing means 128 under the influence of the pressure of the fluid and/or beverage in the capsule 102 for creating at least one exit opening 130 through which the beverage can drain from the capsule 102. According to an embodiment, the capsule 2 may comprise an exit filter 36, through which the beverage can drain from the capsule 2. In that case, the exit filter 36 is preferably arranged to having a sufficiently high tear strength not to be pierced by the lid piercing means 128 under the influence of the pressure inside the capsule 2. Alternatively, or additionally, the exit filter 36 may form a sufficiently low flow resistance for the beverage exiting the capsule 2, that the exit filter 36 is not pressed against the lid piercing means 128 with sufficient force to be pierced by the lid piercing means 128 and the lid stays intact. Hence, the exit filter 36 is adapted to the lid piercing means 128 such that the capsule 2, in use, is not pierced by the lid piercing means 128 and the lid 16 stays intact. More in general it applies that the exit filter 36 and the lid piercing means 128 are adapted to each other such that the capsule 2, in use, is not pierced by the lid piercing means 128 and the lid 16 stays intact.

In the example of FIG. 2 the exit filter 36, forming an exit area of the capsule 2, through which the beverage, here coffee, can drain from the capsule, is formed by a porous sheet, such as filter paper. In this example the entire lid 16 is formed as the exit filter 36. In the example of FIG. 2, the capsule 2 comprises an outwardly extending rim 38 at the second end 18, wherein the lid 16 is attached to the outwardly extending rim 38, e.g. by gluing, welding or the like. Hence, in this example the exit filter 36, i.e. the porous sheet, is attached to the outwardly extending rim 38.

In this example the exit filter 36 forms a substantially continuous fluid-permeable sheet spanning substantially the entire second, open end 18 of the capsule 2. Thus, the fluid can drain from the capsule 2 over a large area. Hence, a very homogeneous drain of beverage from the extractable product is obtained. Thus, the risk of occurrence of preferential paths via which the fluid flows through the extractable product is greatly reduced.

In general, parameters of the exit filter of the capsule 2 of the system 1 can be chosen such that the exit filter does not tear or rupture, e.g. has the sufficiently high tear strength and/or forming the sufficiently low flow resistance not to be pierced or torn. It will be appreciated that the lid and/or the exit filter may deform against the lid piercing means, although it will not rupture or be torn. When the exit filter 36 is e.g. made of filtering paper, parameters of the filtering paper, such as density, thickness and/or PE-content, can easily be chosen to provide the exit filter having the sufficiently high tear strength and/or forming the sufficiently low flow resistance. Alternatively, when the exit filter 36 is e.g. formed by a polymeric film provided with a plurality of exit openings, parameters of the polymeric foil, such as density, thickness, number of exit openings, size and/or shape of exit openings, can easily be chosen to provide the third wall having the sufficiently high tear strength and/or forming the sufficiently low flow resistance.

In the example of FIG. 2, the lid piercing means 128 are shown having sharp toothed points intended for piercing the lid. It will be appreciated that, alternatively, the lid piercing means 128 may have blunt piercing surfaces, e.g. as indicated with dashed lines in FIG. 2. In such embodiment, the capsule 102 may, nevertheless, be pierced by the blunt piercing means 128, e.g. when the lid 116 consists of a sheet of aluminum foil. Parameters of the exit filter of the capsule 2 of the system can be chosen such that the exit filter has the sufficiently high tear strength and/or forms the sufficiently low flow resistance not to be pierced or torn. It will be appreciated that when the lid piercing means are blunt, the parameters of the exit filter may be chosen to suit these blunt piercing means. When the piercing means are blunt, the exit filter may e.g. be thinner than when the lid piercing means are sharp, while guaranteeing that the exit filter has the sufficiently high tear strength and/or forming the sufficiently low flow resistance not to be pierced or torn.

It is possible that the lid piercing means comprise ridges against which the lid, in use, abuts. Such ridges may be formed by the blunt piercing means 128 as shown with dashed lines in FIG. 2. The ridges may e.g. form at least 10%, possibly at least 25% of the portion of the surface of the receptacle 106 which, in use, coincides with the portion of the surface area of the lid 16 overlying the second, open, end 18. Hence, in use, the lid 16 may be supported by the ridges over, e.g. at least 10%, preferably at least 25%, of the portion the surface area of the lid 16 overlying the second, open, end 18. As already indicated, the lid 116 of the capsule 102 may be pierced by such ridges, whereas parameters of the exit filter 36 of the capsule 2 of the system 1 may easily be chosen such that the exit filter has the sufficiently high tear strength and/or forms the sufficiently low flow resistance not to be pierced or torn. It will be appreciated that when the lid piercing means comprise ridges, the parameters of the exit filter may be chosen to suit such lid piercing means.

In the example of FIG. 2, the ridges comprise edges which are not sharp. In this example a radius of curvature of the edges is approximately 50 μm, although other radii are conceivable, such as 100, 200 or 500 μm. The capsule 102 may, nevertheless, be pierced by the blunt piercing means 128, e.g. when the lid 116 consists of a sheet of aluminum foil. It will be appreciated that when the lid piercing means comprise non-sharp edges, the parameters of the exit filter may be chosen to suit such lid piercing means. Parameters of the exit filter of the capsule 2 of the system can be chosen such that the exit filter has the sufficiently high tear strength and/or forming the sufficiently low flow resistance not to be pierced or torn.

It is also possible that the ridges of the lid piercing means 128 have a convex top against which the lid 16 abuts. Hence, when the lid, in use, is pressed against the ridges, the surface area over which the lid is supported by the ridges increases, thus reducing the local pressure exerted on the lid by the ridges. Thus it is possible to provide, in an easy manner, that the lid, in use, does not tear and/or rupture and stays intact.

FIGS. 3a-3d show non-limiting further embodiments of the capsule 2.

Figure 3A:
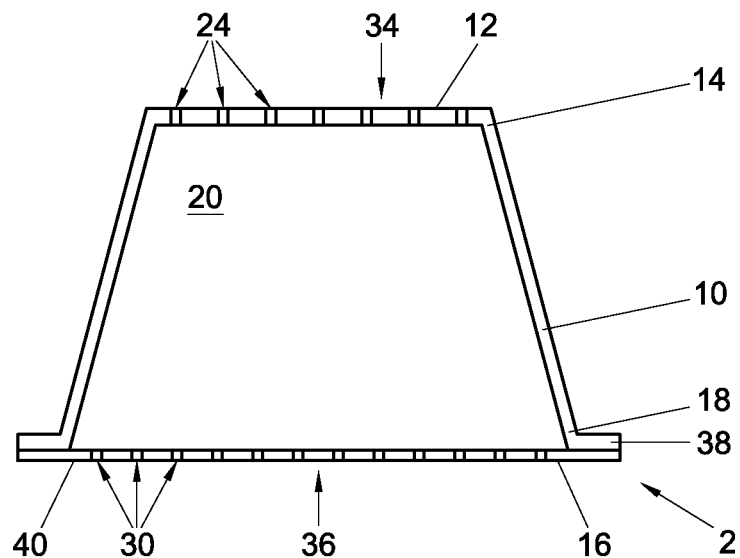
FIGS. 3a-3d show embodiments of capsules.

In FIG. 3a the bottom 12 is integral with the circumferential wall 10 like in FIG. 2. The entrance filter 34 is formed by the plurality of entrance openings 24 in the bottom 12. The exit filter 36 is formed by a foil 40, e.g. a flexible polymeric foil, provided with a plurality of exit openings 30.

Figure 3B:
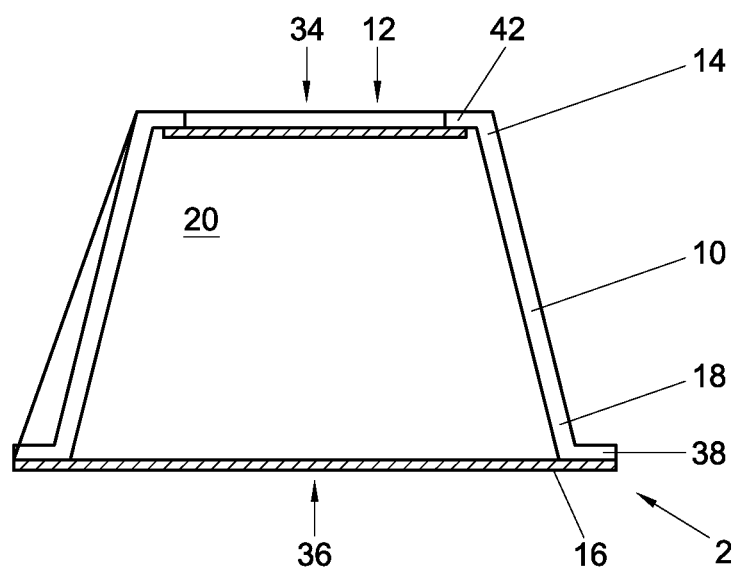

In FIG. 3b the exit filter 36 is formed by the flexible porous sheet, such as filter paper, like in FIG. 2. In FIG. 3b the entrance filter 34 is also formed by a flexible porous sheet, such as filter paper. In this example the entrance filter is attached to an inwardly extending rim 42. In this example, the entrance filter 34 is attached to the inner side of the inwardly extending rim 42. This maximizes the internal volume of the capsule 2, as the rim thickness is not present in the inner space 20 of the capsule 2.

Figure 3C:
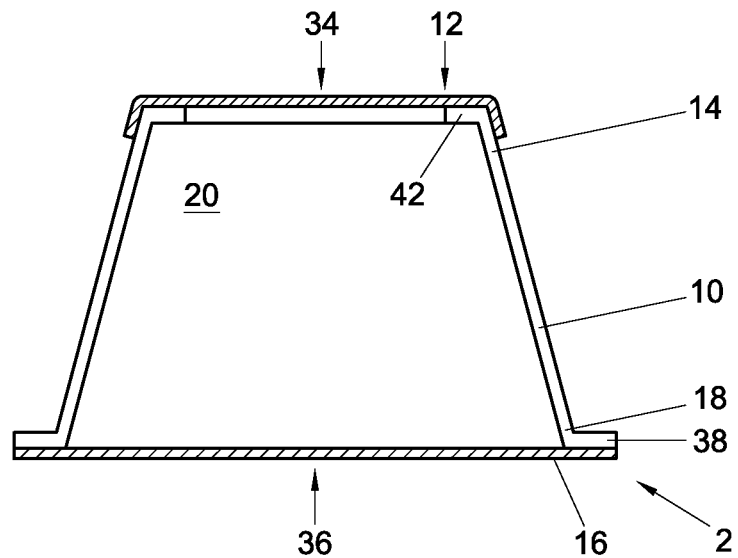

In FIG. 3c the exit filter 36 is formed by the flexible porous sheet, such as filter paper, like in FIGS. 2 and 3b. In FIG. 3c the entrance filter 34 is also formed by a flexible porous sheet, such as filter paper. In this example, the entrance filter 34 is attached to the outer side of the inwardly extending rim 42. Hence, the risk is reduced that the fluid under pressure tears the entrance filter 34 from the inwardly extending rim 42. It is possible that the entrance filter 34 overhangs a circumferential edge of the bottom. Hence, a larger surface area is available for attaching the entrance filter 34 to the bottom 12 and the circumferential wall 10, resulting in a stronger bond.

Figure 3D:
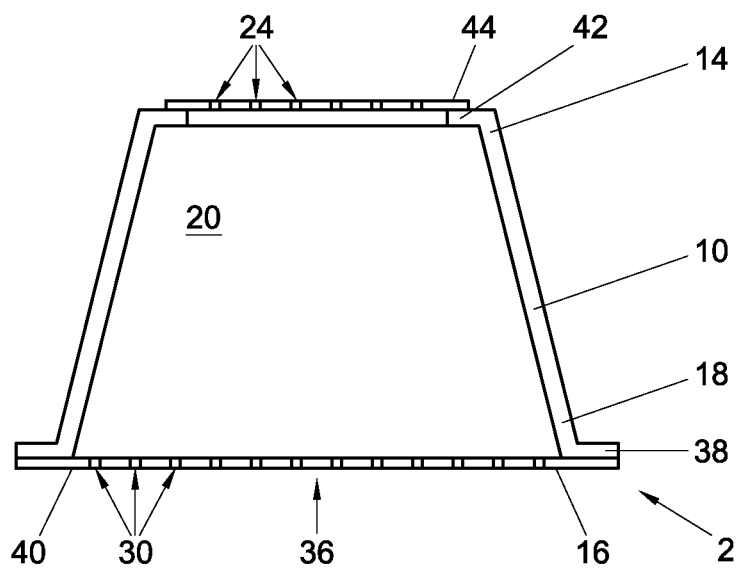

In FIG. 3d the exit filter 36 is formed by a foil 40, e.g. a flexible polymeric foil, provided with a plurality of exit openings 30, as in FIG. 3a. In FIG. 3d the entrance filter 34 is also formed by a foil 44, provided with the plurality of entrance openings 24.

In all embodiments of FIGS. 3a-3d the exit filter is formed by a flexible sheet-shaped material. More specifically, in all embodiments of FIGS. 3a-3d the lid is solely formed by the flexible sheet-shaped material. It has been found that in general no supporting structure, such as a substantially rigid grid, e.g. downstream of the exit foil, is required to support the exit foil to prevent the exit foil from tearing an/or rupturing.

In all embodiments of FIGS. 3b-3d the entrance filter is formed by a flexible sheet-shaped material. More specifically, in all embodiments of FIGS. 3b-3d the entrance area is solely formed by the flexible sheet-shaped material. It has been found that in general no supporting structure, such as a substantially rigid grid, e.g. downstream of the entrance foil, is required to support the entrance foil to prevent the entrance foil from tearing an/or rupturing.

In all embodiments of FIGS. 3a-3d the exit filter forms the outermost boundary of the capsule in the axial direction thereof.

It will be appreciated that the capsule 2 may comprise any entrance filter according to any one of the shown embodiments in combination with any exit filter according to any one of the shown embodiments. Although not shown, it is possible that the lid comprises a substantially rigid wall provided with the exit openings 30.

In general, the exit openings 30, or pores of the porous sheet, are dimensioned such that a dimension of the opening 30 or pore is sufficiently small to retain the extractable product, such as ground coffee, inside the capsule 2. Also in general, the entrance openings 24, or pores of the porous sheet, are dimensioned such that a dimension of the opening 24 or pore is sufficiently small to retain the extractable product, such as ground coffee, inside the capsule 2.

In general, the entrance openings 24 are preferably distributed over substantially the entire surface of the bottom or the foil 44, at least substantially the entire surface of the opening defined by the inwardly extending rim 42. Optionally, entrance openings 24 are also present in the circumferential wall 10, e.g. in the portion of the circumferential wall 10 near the first end 14. This allows homogeneous supply of the fluid to the extractable product inside the capsule 2.

In general, the exit openings 30 are preferably distributed over substantially the entire surface of the lid or the foil 40, at least substantially the entire surface of the opening defined by the outwardly extending rim 38. This allows homogeneous draining of the beverage from the extractable product inside the capsule 2.

In the examples of FIGS. 2, 3a-3d the entrance openings 24 and exit openings 30 have a circular cross section. The openings 24, 30 with circular cross section are easily manufactured. Optionally the cross section of the entrance openings 24 tapers (narrows) towards the inner space 20. This provides the advantage that the entrance openings act as nozzles that cause a jet of fluid to enter the inner space 20.

It will be appreciated that the entrance openings 24 and/or exit openings 30 may also have alternative shapes. The openings 24,30 may for instance have the shape of elongate slits. Preferably, the small dimension of the slits is sufficiently small to retain the extractable product inside the capsule 2.

In a special embodiment, the slits may have a shape that defines a tongue in the plane of the bottom. The slits may then be substantially U-shaped, such as semi-circular, horseshoe shaped, rectangular or V-shaped. This has the advantage that the tongue may be bent out of the plane of the bottom under the effect of the flow of fluid through the opening defined by the tongue. Thus, a larger volume flow of fluid may be attained. If the bottom is made of a resilient material, the tongue will bend back into the plane of the bottom once the flow of fluid stops, thus preventing the spilling of extractable product (prior to and) after preparation of the beverage. It will be appreciated that slits defining a tongue may be applied in the lid mutatis mutandis.

As follows from the above embodiments, a capsule 2, 102 preferably comprises a circumferential first wall 10,110 a second wall 12, 112 closing the circumferential first wall at a first end, and a third wall 16, 116 closing the circumferential first wall at a second, open, end opposite the second wall, the first, second and third wall enclosing an inner space comprising the beverage ingredients.

According to a further embodiment (which further embodiment may be a further elaboration of an above-mentioned embodiment, for example of an embodiment of any of FIGS. 1, 2, 3a, 3b, 3c, 3d), the capsule 2, 102 comprises a sealing member for achieving a sealing effect between the capsule 2, 102 and the beverage production device 104. To this aim, advantageously, the present invention provides for at least one of the first, second and third wall as such to be configured to act as the sealing member. In this way, a very durable capsule can be produced, in an efficient, economical manner. Besides, application of a separate (for example hollow) sealing member can be prevented.

In a further embodiment, the sealing effect can assure that during operation (when the apparatus supplies fluid under the pressure to the extractable product in the capsule, for preparing the beverage), the only water flow is actually taking place through the interior of the capsule. The sealing effect may be achieved between an annular member and a capsule holder, as in EP 1700548, but this is not necessary.

The wall acting as a sealing member can be configured in various ways. Some advantageous, non/limiting examples of the invention are depicted in FIGS. 4 to 9, which will be explained below in further detail.

For example, only the first wall, only the second wall, or only the third wall as such can be configured to provide the sealing member. Alternatively, a combination of the first, second and/or third wall can be configured to act as the sealing member. For example, according to an embodiment, at least two of the first, second and third wall can be made in one piece, and also acts as a sealing member.

In a first preferred example, at least one of the first, second and third wall as such can be dimensioned to act as the sealing member. For example, one or more capsule walls can be dimensioned to sealingly engage one or more opposite walls of the apparatus when the capsule is held in an operating position in the receptacle 2, 102 of the apparatus.

Good results can be obtained in case the capsule does not comprise a hollow sealing member, but for example a massive sealing member. In this way, a more reliable and durable configuration can be obtained.

Also, the wall that is configured to act as the sealing member, may have an outer surface, at least part of which surface is configured to provide a sealing engagement with the enclosing member of a beverage production device 104 during operation.

Preferably, the sealing member is made in one piece with the respective capsule wall, for example by the same manufacturing step. Also, advantageously, the wall that is configured to act as the sealing member may be an elastic wall, for example a wall consisting of elastic material or resilient material, for example rubber or an elastic plastic material.

Further, according to an embodiment, the wall that is configured to act as the sealing member, resiliently cooperates with at least one of the enclosing member of a beverage production device 1 and a capsule holder, to achieve the sealing effect during operation. Alternatively, the wall that is configured to act as the sealing member, plastically deforms when cooperating with at least one of the enclosing member of the beverage production device and a capsule holder, to achieve the sealing effect during operation.

For example, the capsule according to the invention can be part of a system for preparing a predetermined quantity of beverage suitable for consumption using an extractable product, the system also comprising the apparatus 104 comprising a fluid dispensing device for supplying an amount of a fluid, such as water, under or building up to a pressure of at least six bar to the exchangeable capsule, and a receptacle for holding the exchangeable capsule.

Use of the capsule can include a method for preparing a predetermined quantity of beverage suitable for consumption using an extractable product, the method at least comprising: arranging the (exchangeable) capsule with a wall in abutment with a support surface of a receptacle 106 of the apparatus 104, wherein the wall of the capsule preferably acts as a sealing member to achieve a fluid tight seal between the capsule and the beverage production device 104.

First non-limiting example

Figure 4A:
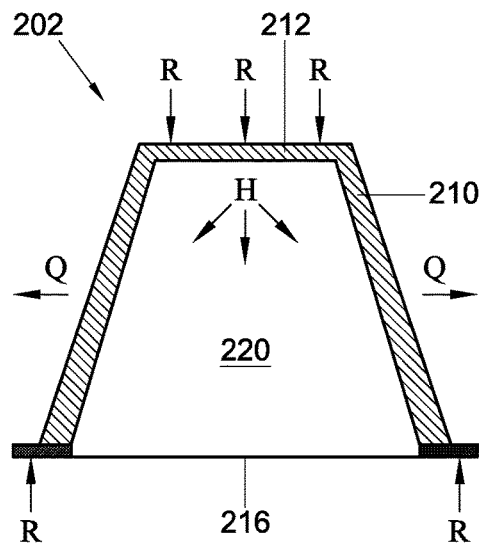
FIGS. 4a-4b show an example of a capsule according to a first embodiment of the invention.

FIG. 4A depicts a capsule 202 according to a further embodiment of the invention. For example, the capsule 202 may be an alternative of the capsule shown in FIG. 1. The capsule 202 of FIG. 4 includes a circumferential wall 210 and a bottom 212, which are preferably made in one piece with one another. Besides, the example includes a lid 216. Preferably, the capsule 202 has a rotational symmetrical configuration.

For example, the capsule can be configured such that the lid 216 can be pierced by lid piercing means 128 of the apparatus 104. Alternatively, the lid 204 can be configured not to be pierced by the lid piercing means 128 during operations, for example a lid similar or equal to the capsule lids shown in FIGS. 2, 3a to 3d. Also, the capsule 202 may be configured such that its bottom 212 is pierced by the bottom piercing means 122 during operation. As an example, the bottom 216 of the capsule, shown in FIG. 4, can be configured the same as a capsule bottom 16 as shown in FIG. 1, or alternatively, as the capsule bottom 16 as shown in any of FIGS. 2, 3a to 3d.

In the FIG. 4 embodiment, preferably both the circumferential wall 210 and the bottom 212 are made of elastic, resilient material, for example rubber or a rubber-like plastic. Particularly, the FIG. 4 capsule embodiment 202 differs from the capsule shown in FIG. 1 in that the circumferential first wall 210 as such is configured to act as the sealing member. For example, the wall 210 can be configured to act as the sealing member, and may resiliently cooperate with at least one of the enclosing member 106 and the capsule holder 190 of a beverage production device 1, to achieve the sealing effect during operation.

Figure 4B:
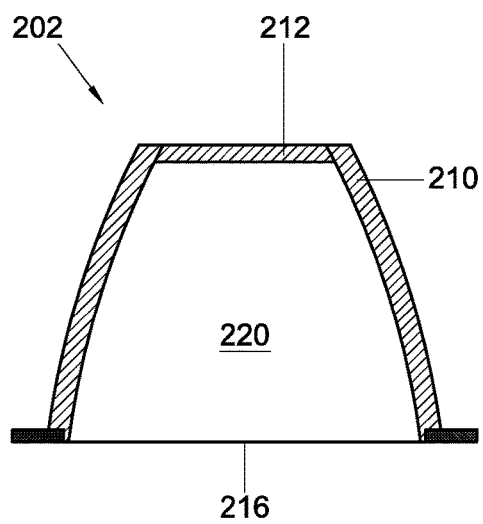

For example, as is indicated in FIG. 4B, operation of the capsule 202 can include deformation of the circumferential wall 210, particularly such that the walls act as a seal with respect to the receptacle 106 of the apparatus 101. For example, the circumferential wall 210 can be pressed or flexed outwardly, to firmly engage the receptacle 106, so that fluid flow paths between capsule 202 and receptacle 106 can be completely blocked.

The deformation of elastic parts of the capsule 202 can be achieved in various ways, for example by mechanical interaction between capsule 202 and apparatus 104, by hydrostatic pressure of the fluid that is supplied to the receptacle and capsule during operation, or both.

For example, according to one further embodiment, the outward deformation of the capsule wall 210 can be achieved by a pressure exerted upon the capsule by the apparatus 101 as a result of closing the receptacle 106, that is, by moving the capsule holder 190 and receptacle 106 towards each other (to a capsule holding state). For example, the capsule 202 can be dimensioned to be (axially) compressed by the receptacle 106 when the capsule 202 is being held between the holder 190 and receptacle 106 (and holder 190 and receptacle 106 have been moved towards each other, to the capsule holding state). In FIG. 4A, arrows R schematically indicate forces, exerted by the apparatus 104

(for example during the moving towards each other of receptacle 106 and holder 190), acting upon the capsule to provide toe axial compression of the capsule 202.

As is shown in FIGS. 4A, 4B, capsule compression may involve an outward flexing of the circumferential wall 210 (indicated by arrows Q), and a axial moving together of the lid 216 and bottom 212. For example, the compression can lead to the circumferential wall 210 deforming (for example from a substantially conical shape) to a more curved shape (when viewed in cross-section), for example a more hemispherical shape or a parabolic of revolution. Also, the compression can lead to an outer surface of the circumferential wall 210 being pressed at least partly against an inner surface of the receptacle 106.

Besides, a flexing of the elastic capsule walls can be achieved by bottom piercing means 108 that may pierce the bottom 212 of the capsule 202 during operation. For example, the bottom piercing means 108 may assist an above-mentioned outward deformation of the circumferential wall, by engaging (and displacing or deforming) the capsule bottom 212 during operation. As an example, to this aim, the capsule bottom 212 can be configured to cooperate with the bottom piercing means 108, utilizing friction, to move axially inwardly (towards the opposite lid 216) over a certain (relatively small) distance. In yet a further embodiment, a deformation of the circumferential wall 210 to achieve the sealing effect, can be fully based on interaction between the bottom piercing means and a capsule part.

According to an embodiment, during operation, the capsule 202 is configured to be compressed such, that the compression leads to a decrease of the interior volume of the capsule 202. The volume decrease can lead to a compression of the content of the capsule (i.e. extractable product), leading to an extracted beverage having an improved strong taste and structure.

Also, according to an alternative embodiment, the capsule 202 is configured to be compressed such, that the compression leads to an increase of the interior volume of the capsule 202. For example, a volume increase can lead to aeration of the content of the capsule (i.e. extractable product) during operation, which can lead to an extracted beverage having a more delicate taste, and for example another structure than a structure that can be obtained by utilizing product compression.

In yet another embodiment, the capsule 202 can configured to be compressed during operation, wherein the compression does not substantially leads to a volume change of the interior 220 of the capsule. Still, in that case, for example, the exterior volume of the capsule 202 may change due to the compression, to achieve a desired sealing effect with the apparatus 104. In a non-limiting example, the content of the capsule 202 can counteract compression, such that the capsule interior 220 does not substantially change volume when the capsule 202 (particularly an exterior of the capsule 202) is being deformed. As an example, this may be achieved by a capsule that is fully filled with a compacted extractable product, for example compacted roasted and ground coffee.

Also, deformation of the sealing wall of the capsule (in this example being the circumferential wall 210) can be partly or totally the result of hydrostatic pressure (schematically indicated by arrows H in FIG. 4A). As an example, fluid that is fed into the capsule under pressure, can deform the flexible circumferential wall 210 outwardly (see arrows Q), leading to a desired sealing effect (with an inner surface of the receptacle).

In an alternative of the FIG. 4 example, only the circumferential capsule wall 210 is made of the elastic resilient material, wherein the capsule bottom 212 may have another configuration (for example a rigid configuration). For example, the bottom 212 of the capsule 202 may be made of a different material than the material of the elastic circumferential wall 210.

Second non-limiting example

Figure 5:
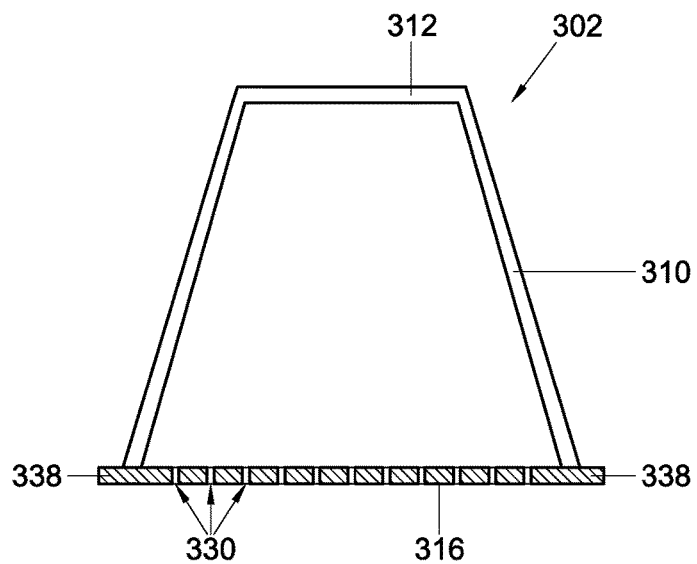
FIG. 5 shows a capsule according to a second embodiment of the invention.

FIG. 5 depicts another embodiment 302 of the invention. The embodiment 302 according to FIG. 5 may include all, or part of, the features of the embodiment 202 according to FIG. 4.

Also, the capsule 302 according to the second embodiment may be an alternative of the capsule shown in FIG. 1. The capsule 302 of FIG. 5 includes a circumferential wall 310 and a bottom 312. Besides, the example includes a lid 316. Further, as an example, the bottom 316 of the capsule 302, shown in FIG. 5, can be configured the same as a capsule bottom 16 as shown in FIG. 1.

As in the above-mentioned embodiments the present capsule 302 may be configured such that the lid 316 can be pierced by lid piercing means 128 of the apparatus 104. However, preferably, the lid 316 is configured not to be pierced by the lid piercing means 128 during operation. As follows from the drawing, preferably, the lid 316 provides an exit filter, and includes a plurality of exit openings or pores 330.

In the FIG. 5 example, advantageously, the lid is configured to act as the sealing member. To this aim, particularly, the lid 316 includes a respective outwardly extending rim (flange) 338, preferably being made in one piece with the lid 316. The present sealing rim 338 is designed to be at least deformed in a substantially normal direction with respect to an outer surface of the respective capsule lid 316.

According to a further embodiment, the lid 316 (and respective sealing rim 338) is an elastic wall, for example made of elastic material, for example rubber or an elastic plastic material. Also, as is shown in FIG. 5, the sealing rim 338 is a solid part of the lid 316 (i.e., the sealing rim 338 does not contain filter apertures). Preferably, the rim 338 (acting as a sealing member) is a solid, massive, sealing ring, for example a solid flat sealing flange. In this embodiment, the rim 338 includes to flat, parallel outer ring-shaped surfaces, extending radially with respect to a centre-line of the capsule 302.

For example, the integral flat rim 316 may be configured to be compressed between (an annular part of) the receptacle 106 and the capsule holder 190, during operation, to provide the blocking of fluid flow paths between receptacle and capsule.

According to an embodiment, the lid 316 is preferably configured not to tear and/or rupture during operation (that is, when fluid under pressure is being supplied to the capsule). Besides, it is conceivable that the lid 316 outwardly deforms during operation, under fluid pressure acting thereon. For example, the outward deformation of the lid 316 may lead to an increase of the exit openings 330. Preferably, the exit openings 330 are configured such, that each opening 330 (or pore) can retain the extractable product, for example as ground coffee, inside the capsule 302, when the respective lid 316 is deformed by the fluid pressure during operation.

Third non-limiting example

Figure 6:
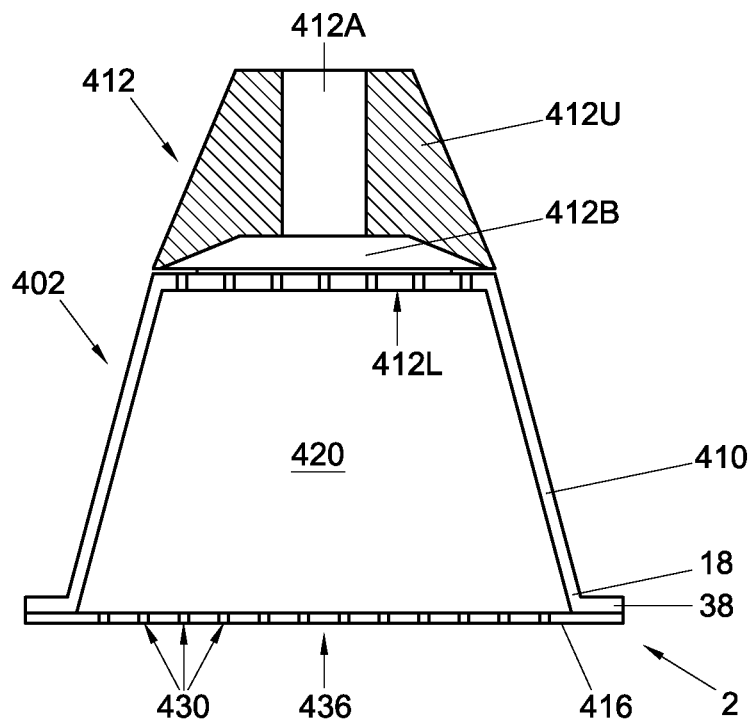
FIG. 6 shows a capsule according to a third embodiment of the invention.

FIG. 6 depicts a third non-limiting example of a capsule 402. In this example a bottom 412 of the capsule 402 is configured to act as a sealing member for achieving a sealing effect between the capsule and the beverage production device 104. The present capsule also comprises a circumferential wall 410 and a lid 416 that may provide an exit filter 436 (for example having exit openings 430).

The embodiment shown in FIG. 6 differs from the embodiment shown in FIG. 4 in that the bottom 412 is configured not to be pierced by the bottom piercing means (dispensing device) 108 of the apparatus 104. To this aim, the bottom 412 (which closes the circumferential first wall 410 at a first end) has a partly hollow configuration.

Particularly, the bottom 412 includes a first bottom part 412U and a second bottom part 412L, enclosing a fluid receiving area 412A, 412B. The fluid receiving area has a first section 412A, being a (central) aperture 412A, to receive the dispensing device 108 when it is in its extended position. A second part 412B of the fluid receiving area is configured to distribute fluid, received from the dispensing device 108, over the second bottom part 412U. The second bottom part 412L serves as an entrance filter, to feed the fluid into the inner space 420 of the capsule 402. For example, the configuration of the second bottom part 412U as such can be the same as or similar to the configuration of the capsule bottom 12 of the FIG. 3a, 3b, 3c or 3d embodiments, or it can have another configuration.

Preferably, at least the first (external) part 412U of the capsule bottom 412 is configured to act as the sealing member, and to resiliently cooperate with the enclosing member of the beverage production device, to achieve the sealing effect during operation. For example, the first bottom part 412U can consist of elastic, preferably resilient, material, for example rubber or an elastic plastic material. As an example, the first bottom part 412U may be dimensioned to be (axially) compressed by the receptacle 106 when the capsule 202 is being held between the holder 190 and receptacle 106 (and holder 190 and receptacle 106 have been moved towards each other, to the capsule holding state).

Fourth non-limiting example

Figure 7:
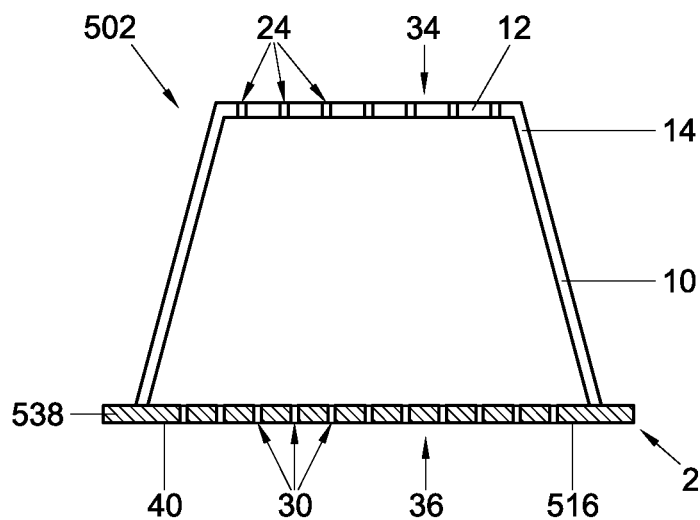
FIG. 7 shows a capsule according to a fourth embodiment of the invention.

FIG. 7 depicts a more preferred fourth example of a capsule 502, which can provide a reliable sealing during operation, and an improved beverage production, at relatively low expenditure. The embodiment shown in FIG. 7 is similar to the example shown in FIG. 3a, but at least differs from that example in that the capsule 502 includes a lid 516 acting as a sealing member (via a respective, integral rim part 538). For example, the lid 516 can be configured the same as, or similar to, the lid 316 of the second example shown in FIG. 5. In the example of FIG. 7, the capsule is provided with a bottom 12 that is not pierced by the dispensing device 108 during operation, leading to abovementioned advantages. Both the lid 516 and bottom 12 can be configured in various different ways, some of which have been further elucidated in the above.

Fifth non-limiting example

Figure 8:
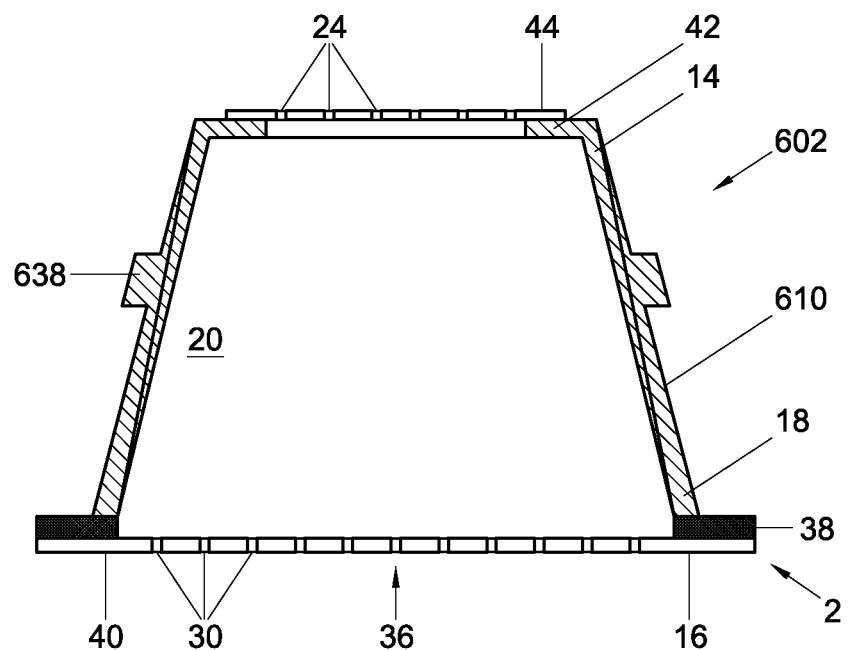
FIG. 8 shows a capsule according to a fifth embodiment of the invention.

FIG. 8 depicts another example of the capsule 602. The embodiment shown in FIG. 8 is similar to the example shown in FIG. 3d, but at least differs from that example in that the capsule 602 includes a circumferential wall 610 acting as a sealing member (via a respective, integral ring-shaped, solid seal part 638). In the sixth embodiment, the sealing member 638 of the circumferential wall 610 projects out of the respective wall (for example in a radial direction). Particularly, the sealing member 638 and respective capsule wall 610 may be designed to deform together, at the same time, for example under influence of an external pressure applied by the apparatus receptacle 106 to the sealing member.

For example, the outwardly projecting seal part 638 and circumferential wall 610 can be made in one piece, from the same material, for example an elastic material, more particularly a rubber or rubber-like (plastic) material. As follows from FIG. 8, for example, the outwardly projecting seal part 638 is spaced-apart from axial end parts of the circumferential wall 610. For example, the seal part 638 can be located at or near an axial centre of the circumferential wall 610. In an alternative embodiment, the seal part 638 of the circumferential wall 610 is located at or near the bottom part of the capsule.

Sixth non-limiting example

Figure 9:
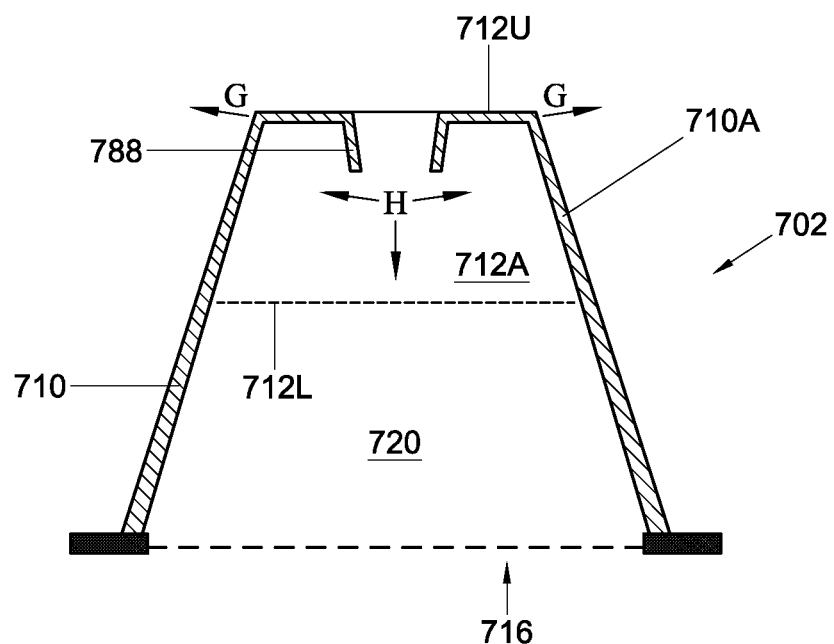
FIG. 9 shows a capsule according to a sixth embodiment of the invention.

FIG. 9 depicts a sixth example of a capsule 702. The present example provides an alternative of the embodiment shown in FIG. 6. As in FIG. 6, the FIG. 9 capsule embodiment 702 is provided with a bottom 712 that is configured to act as a sealing member for achieving a sealing effect between the capsule and the beverage production device 104. The present capsule also comprises a circumferential wall 710 and a lid 716 that may provide an exit filter 736.

The bottom 712 of the embodiment shown in FIG. 9 (which closes the circumferential first wall 710 at a first end) has a partly hollow configuration.

Particularly, the bottom 712 includes a first bottom part 612U and a second bottom part 712L, enclosing a fluid receiving area 712A with a circumferential bottom part 710A. For example, part of the circumferential wall 710 may provide the circumferential part 710A of the hollow bottom 712.

The fluid receiving area 712A of the capsule's bottom 712 can receive the dispensing device 108 when that device it is in its extended position. The fluid receiving area 712A can also distribute fluid, received from the dispensing device 108, over the second bottom part 712U. As in the FIG. 6 example, the second bottom part 712L serves as an entrance filter, to feed the fluid into the space 720 that contains the extractable product.

In the FIG. 9 embodiment, preferably, at least the first (external) part 712U of the capsule bottom 712 can act as the sealing member, by sealingly engaging the enclosing member of the beverage production device, during operation. For example, the first bottom part 712U can consist of elastic, preferably resilient, material, for example rubber or an elastic plastic material. As is indicated in FIG. 9, via arrows G, the resilient part 712U may be pressed outwardly (at least in a radial direction) by fluid fed under pressure into the bottom 712 (respective hydrostatic pressure is schematically indicated by arrows H in FIG. 9).

In the present example, the hollow bottom 712 includes a fluid flow blocking structure to prevent or counteract fluid to flow out of the capsule bottom to the apparatus receptacle 106. For example, the blocking structure can include a tapered or cylindrical sleeve 788, extending from the first (external) bottom part 712U towards the second (internal) bottom part 712L. Preferably, the blocking structure 788 is dimensioned to receive an afore-mentioned fluid dispensing device 108 with relatively little or no clearance. A radially outer surface of the sleeve 788 and an inner surface of the circumferential wall art 710A can enclose an area, receiving pressured fluid (fed into the bottom) during operation. The resulting fluid pressure can force the sleeve 788 and circumferential wall art 710A apart (in radial direction), preferably leading to the circumferential wall art 710A being pressed against an internal surface of the apparatus 104, and preferably also leading to the sleeve 788 being pressed against (around) the fluid dispensing device 108. Thus, in improved sealing effect can be obtained.

Seventh non-limiting example

Figure 10:
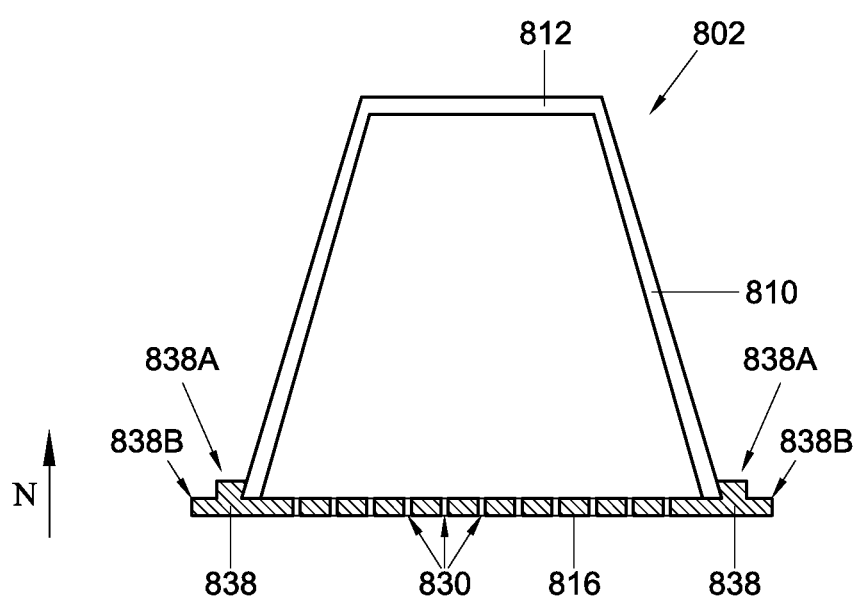
FIG. 10 shows a capsule according to a seventh embodiment of the invention

FIG. 10 depicts another embodiment 802 of the invention. For example, the embodiment 802 according to FIG. 10 may include all, or part of, the features of the embodiment 302 according to FIG. 5. Also, the capsule 802 according to the seventh embodiment may be an alternative of the capsule shown in FIG. 1.

Particularly, the capsule 802 of FIG. 10 includes a circumferential wall 810 and a bottom 812. Besides, the example includes a lid 816. In the FIG. 10 example, advantageously, an outwardly extending (ring-like) rim (flange) 838 is provided to act as the sealing member. Optionally, the rim 838 can be made in one piece with the lid 816. Preferably, the rim 838 is made in one piece with the circumferential wall 810. Preferably, the rim 838 is made of the same material as the circumferential wall 810.

The present capsule rim 838 is provided with a relatively thick section 838A (a ridge), for example being thicker (when measured in a normal direction N with respect to an outer surface of the respective capsule lid 816) than an adjacent part 838B of the rim. In the present example, the ridge part 838A extends adjacent the edge of the circumferential wall 810, the second rim part 838B (having a smaller thickness than the thickness of the ridge rim part) extending around the ridge part 838A. Alternatively, the ridge part 838A may be radially spaced-apart from the edge of the circumferential wall 810. A radial with of the ridge part 838A can be about the same as a radial width of a remaining part (838B) of the rim, or it can be smaller or larger than that radial width (for example smaller or larger in the range of about 1-99%).

The thickness of the ridge part 838A is constant in this example. For example, a thickness of the ridge part 838A (measured in said normal direction N) can be 0.1 mm larger, or more, than a thickness of the second rim part 838B (measured in the same direction N). In a further non-limiting embodiment, a difference between the two thicknesses (i.e. of the parts 838A and 838B) can be in the range of 0.1-1 mm.

In a further example, prior to use, the thickness of the second rim part 838B can be approximately 0.2 mm. In that case, preferably, the thickness of the ridge part 838A is less than 0.5 mm, more preferably less than 0.41 mm, for example less than 0.35 mm.

Thus, in an embodiment, the capsule shown in FIG. 10 can comprise a single substantially concentric circumferential ridge 838A extending outwardly of the cup. In a further embodiment, the ridge 838A can be made of the same material as the circumferential wall 810.

The present sealing rim part 838A can be designed to be at least deformed in a substantially normal direction with respect to an outer surface of the respective capsule lid 816. According to a further embodiment, the overall sealing rim 838 is an elastic part, for example made of elastic material, for example rubber or an elastic plastic material. In another embodiment, the sealing rim 838 is a non-elastic deforming part, for example made of plastic deformable material, being compressed during operation to achieve the sealing effect. Preferably, the rim 838 (acting as a sealing member) is a solid, massive, sealing ring, for example a solid flat sealing flange.

Also, for example, the ridge part 838A may be configured to be compressed between (an annular part of) the receptacle 106 and the capsule holder 190, during operation, to provide the blocking of fluid flow paths between receptacle and capsule.

In FIG. 10, upper surfaces of the two rim parts 838A, 838B (the surfaces being faced away from the outer surface of the lid 816) extend in parallel with respect to each other and with the outer surface of the lid, however, this is not essential. For example, in an alternative embodiment, the ridge part 838A can be provided with an upper surface that has a curved shape (when viewed in cross-section), or a surface that includes an angle in the range of about 10-80 degrees, for example 30-60 degrees, with the upper surface of the other rim part 838B (when viewed in cross-section).

Various modifications of the capsule 802 as shown in FIG. 10 are envisaged. For example, the capsule can be provided with a ridge part, that is spaced-apart from a first ridge part, a thinner rim part being enclosed there-between. Also, in an alternative embodiment, the capsule can be provided with a ridge part that extends along the outer perimeter of the rim.

The exemplary embodiments described above provide considerable improvements over prior art capsules and respective beverage production systems. Since at least one of the first, second and third wall as such is configured to act as the sealing member, the capsule does not have to be provided with a dedicated hollow sealing member. Besides, embodiments of the capsule according to the invention can be manufactured very efficiently, utilizing relatively little energy and materials. Also, certain embodiments provide for a compressible or otherwise deforming capsule wall, acting as sealing wall, which can provide improvement of the beverage brewing process itself. For example, relatively good results can be achieved in case the sealing member is a solid ring shaped member that is integral part of a capsule wall.

In the foregoing specification, the invention has been described with reference to specific examples of embodiments of the invention. It will, however, be evident that various modifications and changes may be made therein without departing from the broader spirit and scope of the invention as set forth in the appended claims.

In the claims, any reference signs placed between parentheses shall not be construed as limiting the claim. The word 'comprising' does not exclude the presence of other features or steps then those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to advantage.

Also, for example, various parts of the capsule may be made of various materials. In an alternative embodiment, a wall or wall part acting as a sealing member can be made of elastic material, for example rubber or an elastic plastic material. The wall, acting as sealing member, can also be made, for example, of metal, for example one or more layers of a metal foil. Besides, the wall configured to act as sealing member can contain a combination of elastic material and metal material, for example a wall that is made of one or more elastic layers and one or more elastic plastic.

In a more preferred embodiment, the wall (or walls) acting as sealing member can include at least one outer elastic layer, for example consisting of rubber or rubber-like material, and at least one inner layer that is made of a different material (for example metal foil). As an example, the capsule may be provided by a first rigid capsule part that contains beverage ingredients, and a second capsule part that is connected to the first part, to act as a sealing wall.

Also, according to an embodiment, the capsule, for example the wall that can act as a sealing member, can be provided with a coating or layer of a water repelling material, for example Teflon, to further enhance the sealing effect.

What is claimed is:

1. A capsule for containing beverage ingredients, the capsule being designed for insertion in a beverage production device in which a liquid under pressure enters the capsule to drain a beverage from the capsule, the capsule comprising:
    a circumferential first wall;
    a bottom closing the circumferential first wall at a first end;
    a lid closing the circumferential first wall at a second, open, end opposite the bottom, the first wall, bottom, and lid enclosing an inner space comprising the beverage ingredients, wherein the circumferential first wall includes an outwardly extending rim; and
    a sealing member for achieving a sealing effect between the capsule and the beverage production device,
    wherein the sealing member is formed by a first part of the rim adjacent the edge of the circumferential wall that is 0.1 mm or more thicker, in a direction away from an outer surface of the lid, than a radially adjacent second part of the rim which extends around the first part;
    wherein the sealing member is an integral non-elastic deforming part of the rim that is made of a plastic deformable material;
    wherein the sealing member is a solid sealing ring,
    wherein the sealing member is configured to plastically deform when cooperating with at least one of an enclosing member of a beverage production device and a capsule holder, to achieve a sealing effect during operation.

2. The capsule of claim 1, wherein the sealing member is configured to provide a sealing engagement with an enclosing member of the beverage production device during operation.

3. The capsule of claim 1, wherein the sealing member is designed to be deformed in a normal direction with respect to an outer surface of a respective capsule wall.

4. The capsule of claim 1, wherein the capsule, including the first part of the rim that is configured to act as the sealing member, has a rotational symmetrical configuration.

5. The capsule of claim 1, wherein the sealing member comprises a circumferential ridge.

6. A combination of an exchangeable capsule and a fluid dispensing device including a receptacle for holding the exchangeable capsule for preparing a predetermined quantity of beverage suitable for consumption using an extractable product, the combination comprising:
    an exchangeable capsule; and
    an apparatus comprising a fluid dispensing device for supplying an amount of a fluid under pressure to the exchangeable capsule, and a receptacle for holding the exchangeable capsule;
    wherein the exchangeable capsule comprises a circumferential first wall, a bottom closing the circumferential first wall at a first end, and a lid closing the circumferential first wall at a second, open, end opposite the bottom, the first wall, the bottom, and the lid enclosing an inner space comprising the beverage ingredients, wherein the circumferential first wall includes an outwardly extending rim, wherein the capsule comprises a sealing member for achieving a sealing effect between the capsule and the beverage production device;
    wherein the sealing member is integrally formed by a first part of the rim adjacent the edge of the circumferential wall that is 0.1 mm or more thicker, in a direction away from the outer surface of the lid, than a radially adjacent second part of the rim which extends around the first part, the first part of the rim being compressed between the receptacle and the capsule holder during operation;
    wherein the sealing member is a non-elastic deforming part of the rim that is made of plastic deformable material;
    wherein the sealing member is a solid sealing rim,
    wherein the sealing member is configured to plastically deform when cooperating with at least one of the closing member of a beverage production device and a capsule holder, to achieve the sealing effect during operation.

7. The capsule of claim 6, wherein the first part of the rim adjacent the edge of the circumferential wall has a substantially constant first thickness and the second part of the rim extending about the first part of the rim has a substantially constant second thickness lesser than the first thickness such that the first part of the rim and the second part of the rim form a stepped profile.

8. The capsule of claim 1, wherein the sealing member is a solid flat sealing flange.

9. The capsule of claim 1, wherein the first part of the rim adjacent the edge of the circumferential wall has a substantially constant first thickness and the second part of the rim extending about the first part of the rim has a substantially constant second thickness lesser than the first thickness such that the first part of the rim and the second part of the rim form a stepped profile.

* * * * *